United States Patent Office 2,698,313
Patented Dec. 28, 1954

2,698,313

THERMOPLASTIC COMPOSITION OF STYRENE-ACRYLONITRILE RESIN WITH NITRILE RUBBER AND ACRYLATE-TYPE RUBBER

Lawrence E. Daly, Mishawaka, Ind., assignor to United States Rubber Company, New York, N. Y., a corporation of New Jersey No Drawing. Application September 3, 1952,
Serial No. 307,713

14 Claims. (Cl. 260—45.5)

This invention relates to improved hard, tough, thermoplastic compositions characterized by superior aging properties, and, more particularly, it relates to blends of resinous materials which are copolymers of styrene and acrylonitrile with an elastomeric component made up partly of nitrile rubber and partly of certain saturated acrylate-type rubbers.

There have been a variety of thermoplastic materials known to the art, suitable for use in forming shaped articles of various kinds by such operations as calendering, molding, and drawing. However, the available compositions of this character have generally found only limited application for outdoor uses, because it was not feasible to provide, as economically as would be desirable, tough thermoplastic compositions which would withstand the effects of exposure to sun and the weather over prolonged periods of time.

Accordingly, it is a principal object of the present invention to provide a tough thermoplastic composition having improved aging characteristics, particularly under conditions of outdoor exposure.

The invention is based on the unexpected discovery that resinous styrene-acrylonitrile copolymers can be blended with nitrile rubber and certain saturated acrylate-type rubbers to form intimate homogeneous mixtures that are capable of being worked and formed into shaped objects having remarkable strength, which is retained to a surprising degree even after prolonged exposure to severe aging conditions.

The improved mixtures of the invention are therefore comprised of a normally inelastic resinous portion, and a rubbery or elastomeric portion, which is in turn made up of two kinds of normally elastic synthetic rubber. The resinous portion is a normally hard thermoplastic copolymer containing from about 50% to about 90% of combined styrene and correspondingly from about 50% down to about 10% of combined acrylonitrile, based on the sum of the weights of the two materials. More preferably, the styrene-acrylonitrile resinous copolymer used in the invention is one having an intrinsic viscosity, measured in dimethyl formamide, of from 1 to 2 and an acrylonitrile content of from 20% to 30%, the styrene content correspondingly ranging from 80% to 70%. As the intrinsic viscosity and acrylonitrile content of the resin increase above these values, the resin is harder and more brittle, resulting in compositions which have undesirably low impact values at low temperatures, say below 20° F. Resins having an intrinsic viscosity below 1.0, say from 0.5 to 1.0, can be used, but in general result in compositions having lower heat distortion values and lacking the desired rigidity.

A styrene-acrylonitrile resinous copolymer having an acrylonitrile content of from 20 to 30% and an intrinsic viscosity of from 1.0 to 2.0 can be made following the teachings of Patent No. 2,439,202. As is well known to those skilled in the art, the relative proportions of styrene and acrylonitrile in the monomeric charge determine the percentage of acrylonitrile in the finished polymer. The percentage of acrylonitrile in the finished polymer is not, however, the same as in the charge. For example, a 50–50 charge will give an acrylonitrile content in the polymer of the order of 45%, whereas a charge of 15% acrylonitrile and 85% styrene will give a polymer having an acrylonitrile content of the order of 12–13%. Those skilled in the art can readily select a monomeric charge giving a polymer containing 20–30% combined acrylonitrile. As to intrinsic viscosity, this is affected by the nature and the amount of the modifier used. Increasing the amount of the modifier, such as dodecyl mercaptan, will effect a decrease in the intrinsic viscosity of the polymer. Thus, one skilled in the art can readily select the modifier in amount thereof to produce a polymer having an intrinsic viscosity in the above limits. Furthermore, several styrene-acrylonitrile resinous copolymers are available commercially, and the skilled chemist can by standard methods of analysis select from these resins having the preferred acrylonitrile content and intrinsic viscosity set out above.

Considering now the rubbery or elastomeric portion of the mixtures of the invention, and considering in particular the nitrile rubber component of the rubbery portion, this material is a well known article of commerce, commonly known as Buna N, and is made by copolymerizing butadiene-1,3 and acrylonitrile in a manner well understood by those skilled in the art. The nitrile rubber typically contains from 18% to 48% of acrylonitrile and correspondingly from 82% to 52% by weight of butadiene-1,3. In a preferred form of the invention, the nitrile rubber is one which is so modified as to contain a substantial proportion of toluene-insoluble "B" gel, or tight gel. Such nitrile rubber having a high tight gel content may be prepared, for example, by masticating the ordinary low-gel nitrile rubber at elevated temperatures (e. g., 280° to 340° F.) for a period of time (e. g., 30 to 90 minutes) as is disclosed in more detail in my U. S. Patent 2,550,139. Also, certain of the commercially available nitrile rubbers are characterized by a relatively high tight gel content, and these may be employed to advantage in the invention. The nitrile rubber containing such high tight gel is preferable because it processes more satisfactorily and leads to improved physical properties in the mixtures. Thus, when the tight gel content is within the range of 50% to 80%, there is imparted an unusual smoothness in the final rubber-resin mixture, and a minimum of shrinkage is observed in a calendered sheet. Processing characteristics are improved in general, both on mills and calenders, and during subsequent molding and forming operations.

The remaining component of the elastomeric portion of the mixtures of the invention, namely, the saturated acrylate-type rubber component, may be described as a normally elastic polymer comprised essentially of an alkyl acrylate in which the alkyl group is a lower alkyl group, that is, an alkyl group containing less than 5 carbon atoms. Preferably the alkyl acrylate is copolymerized with a relatively small proportion of a copolymerizable monomer such as acrylonitrile, 3-chloropropyl acrylate or 2-chloroethyl vinyl ether. The copolymers preferably are derived from monomeric mixes containing from about 80% to 96% of the alkyl acrylate, and correspondingly from 20% to 4% of the copolymerizable monoethylenically unsaturated monomer. Such polymers and copolymers of alkyl acrylates are rubbery, and may be prepared by conventional methods, such as are described, for example, by Mast et al., Ind. Eng. Chem., 36, 1022 (1944). The acrylate-type rubbers based on ethyl acrylate, copolymerized with one of the aforesaid copolymerizable monoethylenically unsaturated monomers, are preferred for use in the invention.

In formulating the mixtures of the invention, there is employed from about 50% up to about 90% of the resin and correspondingly from about 50% down to about 10% of the rubbery portion, based on the sum of the weights of the resinous and rubbery portions. More preferably, from 60% to 80%, of resin, and correspondingly from 40% to 20% of the rubbers, is employed.

It has been found that the rubbery portion of the mixture should include the nitrile rubber and the acrylate-type rubber in definite proportions, for optimum results in the final mixture. The acrylate-type rubber should constitute no less than 5% nor more than 20% of the total mixture of both rubber and resin. The quantity of acrylate-type rubber will not vary outside of these limits, irrespective of changes in the relative proportions of the other two essential ingredients, namely, the nitrile rubber and the resin. The problem is one of compatibility, and in the mixture the acrylate rubber surprisingly appears to be soluble in the styrene-acrylonitrile resin to about the same extent as it is in the nitrile rubber. In terms of the total rubber content of the mixture, it may be stated that the acrylate-type rubber constitutes from 15% to 65% of the rubber employed, while the nitrile rubber correspondingly constitutes from 85% to 35% of the rubber. More preferably, the acrylate-type rubber is employed in amount of from 30% to 50% of the total rubber constituents.

In carrying out the invention, the resinous components and the two rubbery components may be mixed together in the required proportions, in any order, and in any suitable manner, such as on the usual rubber or plastic mixing roll mill, or in an internal mixer, like the Banbury mixer. The ingredients may be mixed in any desired order with the aid of elevated temperatures, such as, for example, temperatures of 250° to 400° F., and more preferably the mixing temperature is within the range from 300° to 350° F. Such mechanical mixing produces the desired intimate blend having good physical properties. Less preferably, the various components may, if desired, be blended together in the form of latices or dispersions or solutions, and the mixed latices or dispersions may thereafter be co-precipitated, or the solution may be dried, to yield a blend of the various ingredients.

As will be evident to those skilled in the art, various additional optional ingredients may be added, such as fillers, reinforcing agents or pigments (e. g., carbon black, wood flour, diatomaceous earth, fibers), as well as stabilizers, anti-oxidants, plasticizers, etc.

The following examples will serve to illustrate the invention in more detail.

EXAMPLE 1

Mixtures of acrylonitrile-styrene resin, nitrile rubber and acrylate-type rubber, in the proportions shown in the table below were prepared by mixing the materials together in a Banbury mixer maintained at 300–320° F. The acrylonitrile-styrene resin contained about 72% of styrene and 28% of acrylonitrile, and was prepared by emulsion copolymerization. The nitrile rubber was a commercial grade of butadiene-acrylonitrile copolymer sold under the trade designation Paracril 35-NS 90, containing about 35% of acrylonitrile. The saturated acrylate-type rubber was a commercially available material sold under the trade designation Hycar PA-21, and was believed to be a copolymer of 95% of ethyl acrylate with 5% of 2-chloroethyl vinyl ether. Test specimens were prepared from the mixtures shown in the table by calendering the material into a sheet 0.020″ in thickness, and molding several plies of such sheets into a specimen ⅛″ thick in a heated hydraulic press at a platen temperature of 325° F. and a pressure of 200 to 500 p. s. i. The press platens were cooled to 125° F. before removing the samples. The impact strength of the samples was measured by the Charpy notched sample method, and the elongation at break was also measured. These tests were also repeated on samples which had been aged for 14 days in an oxygen bomb, with the results noted below.

*Table I*

| Ingredients | Parts by Weight | |
|---|---|---|
| | A | B |
| Styrene-acrylonitrile resin | 70 | 70 |
| Nitrile rubber | 30 | 20 |
| Acrylate-type rubber | | 10 |

PHYSICAL PROPERTIES BEFORE AGING

| | | |
|---|---|---|
| Charpy notched impact strength ft.-lbs | 14 | 15.4 |
| Elongation at break percent | 40 | 81 |

PHYSICAL PROPERTIES AFTER AGING 14 DAYS IN OXYGEN BOMB

| | | |
|---|---|---|
| Charpy notched impact ft.-lbs | 9.2 | 13.8 |
| Elongation at break percent | 21 | 76 |

It will be evident from inspection of the foregoing data that the inclusion of 10% of the saturated acrylate-type rubber, as in stock B, produced a significant improvement in the impact strength, and especially in the elongation at break of the mixture. Still more surprising is the manner in which this relatively small amount of acrylate-type rubber greatly increased the aging properties of the stock, as evidenced by the fact that the aged stock A deteriorated severely as the result of the aging, whereas the stock B containing the acrylate-type rubber was still in good serviceable condition after such aging.

EXAMPLE 2

Additional mixtures were prepared in the manner described in Example 1, but employing ingredients and proportions as indicated in Table II, below. The resin employed contained 72% of styrene and 28% of acrylonitrile. The nitrile rubber contained 65% of butadiene and 35% of acrylonitrile, and had a B-gel content of 68%. The acrylate-type elastomer was derived from a mixture of 95% ethyl acrylate, and 5% 2-chloroethyl vinyl ether. Test specimens were prepared from the mixture as described in Example 1, and the tensile strength, the elongation at break, and the impact strength were measured both before and after aging for 14 days in an oxygen bomb, with the results noted in Table II below.

*Table II*

| Ingredients | Parts by Weight | | |
|---|---|---|---|
| | C | D | E |
| Styrene-acrylonitrile resin | 70 | 70 | 70 |
| Nitrile rubber (68% B gel) | 20 | 15 | 10 |
| Ethyl acrylate-chloroethyl vinyl ether copolymer 95/5 | 10 | 15 | 20 |
| Total | 100 | 100 | 100 |

PHYSICAL PROPERTIES BEFORE AGING

| | | | |
|---|---|---|---|
| Tensile strength (lbs./sq. in.) | 3,271 | 3,340 | 2,642 |
| Elongation at break (percent) | 62 | 30 | 18 |
| Charpy notched impact strength (ft.-lbs./in. notch at 70° F.) | 13.8 | 10.0 | 3.1 |

PHYSICAL PROPERTIES AFTER AGING 14 DAYS IN OXYGEN BOMB

| | | | |
|---|---|---|---|
| Tensile strength | 3,392 | 3,310 | 2,660 |
| Elongation | 60 | 28 | 14.5 |
| Charpy impact | 12.6 | 10.1 | 2.9 |

It will be noted from Table II that the mixtures C, D and E possess good initial physical properties, that are substantially retained even after the severe accelerated aging period in the oxygen bomb. In contrast to this, a control mixture containing 70 parts of the resin and 30 parts of the nitrile rubber, with none of the acrylate-type rubber, aged very poorly. The mixture C, containing 10 parts of the acrylate rubber, is particularly remarkable in that its initial impact strength is more than 40% higher than the impact strength of a control mix (resin and nitrile rubber alone in 70:30 ratio). The mixes D and E, containing 15% and 20%, respectively, of the acrylate-type rubber also have initial physical properties superior to most of the usual thermoplastic systems, and, more significantly, they withstand aging to an extent heretofore unknown in systems of this kind.

If it is attempted to prepare a mixture similar to that of this example, but containing 30 parts of the acrylate-type rubber and none of the nitrile rubber, the mixture cannot be processed, but simply crumbles on the mill indicating that the materials are not compatible in this ratio. The good physical properties of the mixtures C, D and E are especially surprising in view of the foregoing fact.

EXAMPLE 3

The results obtained when using an acrylate-type rubber composed of a copolymer derived from 87.5% N-butyl acrylate and 12.5% acrylonitrile are shown in Table III below. The mixes were made in the same manner as described in Example 1, and the styrene-acrylonitrile resin and nitrile rubber employed were the same as in Example 2.

Table III

| Ingredients | Parts by Weight | | |
|---|---|---|---|
| | F | G | H |
| Styrene-acrylonitrile resin | 70 | 70 | 70 |
| Nitrile rubber | 20 | 15 | 10 |
| N-butyl acrylate-acrylonitrile rubber (87.5/12.5) | 10 | 15 | 20 |
| Total | 100 | 100 | 100 |

PHYSICAL PROPERTIES BEFORE AGING

| | F | G | H |
|---|---|---|---|
| Tensile strength | 2,997 | 2,951 | 2,687 |
| Elongation | 65 | 68 | 61 |
| Impact strength | 8.4 | 4.4 | 3.5 |

PHYSICAL PROPERTIES AFTER AGING 14 DAYS IN OXYGEN BOMB

| | F | G | H |
|---|---|---|---|
| Tensile strength | 3,117 | 2,951 | 2,905 |
| Elongation | 65 | 68 | 61 |
| Impact strength (Charpy notched) | 8.6 | 4.4 | 4.6 |

The data of Table III show the absence of any adverse effect consequent to aging the mixture F, G and H of the invention, which include the acrylate-type rubber in the stated proportions, whereas in a control mix, containing only the resin and the nitrile rubber in 70:30 ratio, the aging produced a particularly serious loss in impact strength. Also, if the proportion of acrylate-type rubber is increased to 30 parts, and the nitrile rubber is omitted, the resulting mixture is crumbly and unprocessable. Therefore, both the nitrile rubber and the acrylate-type rubber are essential to the invention.

The thermoplastic compositions of this invention can be vulcanized. However, it is preferred not to vulcanize because the vulcanized scrap is very difficult, if not impossible, to use. The stock after vulcanizing will crumble when it is put on the mill, just like cured rubber. It may be desirable, in some instances, to cure the mixture. For this purpose, various curing agents may be used, including sulfur, sulfur-bearing compounds, amines, the hydroxides of bivalent metals used with stearic acid, quinone dioxine and metal oxides and benzoyl peroxide.

The following example illustrates cure of the mixture.

EXAMPLE 4

The following table illustrates the physical properties of preferred compositions cured with sulfur, Altax and zinc oxide.

Table IV

| Ingredients | Parts by Weight | | | |
|---|---|---|---|---|
| | A | B | C | D |
| Styrene-acrylonitrile resin | 70 | 70 | 70 | 70 |
| Nitrile rubber | 20 | 15 | 20 | 15 |
| Ethyl acrylate-chlorethyl vinyl ether copolymer 95/5 | 10 | 15 | | |
| N-butyl acrylate-acrylonitrile rubber 87.5/12.5 | | | 10 | 15 |
| Sulfur | 2 | 2 | 2 | 2 |
| Altax (benzothiazyl disulfide) | 1.5 | 1.5 | 1.5 | 1.5 |
| Zinc oxide | 5 | 5 | 5 | 5 |
| Curing time ⅛" pressed sheet in platen press (minutes) | 60 | 60 | 60 | 60 |
| Curing temperature, °F | 325 | 325 | 325 | 325 |
| Tensile strength, p. s. i | 3,290 | 3,340 | 3,010 | 2,980 |
| Elongation, percent | 62 | 30 | 68 | 72 |
| Impact strength (Charpy notched) | 13.8 | 10 | 8.6 | 5 |
| After 14 days in oxygen bomb: | | | | |
| Tensile strength, p. s. i | 3,420 | 3,320 | 2,992 | 2,988 |
| Elongation, percent | 64 | 32 | 65 | 70 |
| Charpy impact strength | 12.8 | 10 | 8.4 | 5.1 |

The new materials formulated in accordance with the invention have also been tested outdoors to demonstrate their unusual resistance to aging and weathering. Thus, samples of material corresponding to stock D of Table II, above, were still in good condition after three months outdoor exposure, whereas a control sample, containing none of the acrylate-type rubber, was in unsatisfactory condition and badly chalked.

The invention therefore provides a novel composition which can be formed by conventional means into articles of unusual physical properties. The compositions may be ground or powdered and used as molding compositions for either compression molding or injection molding. Also, the compositions may be calendered or otherwise formed into sheets, which can be shaped further by molding or drawing. The compositions are useful as a substitute or replacement for the usual plastic or rubber materials, or even for replacing metal or other materials, especially in applications where great toughness and resistance to blows and abrasion are required. Thus, the present mixtures may be used to fabricate parts for machines, such as gears and cams; parts for textile machinery, such as bobbins, shuttles, pickers, etc.; containers and pipes, especially for chemical and the like operations where resistance to corrosive substances is desired, as in filter press plates; tumbling barrels for plating operations; electrical parts, such as terminal blocks, telephones, and protective casings for cable joints; as well as tote boxes and trays, luggage, radio cabinets, radar housings, furniture, phonograph records, paneling, automobile parts such as door panels and steering wheels, roller skate wheels, protective helmets, printing plates, die cutting blocks, and numerous other articles, as will be evident to those skilled in the art. Abrasive particles may be mixed with the compositions to form grinding wheels and the like. Because of their superior resistance to oxidation, the compositions are especially suited for use out of doors, such as in making signs or outdoor displays, or exterior parts of buildings, automobiles and trucks, or for surfacing the decks or cabins of boats and ships.

Having thus described my invention, what I claim and desire to protect by Letters Patent is:

1. A hard, tough composition characterized by exceptional resistance to oxidation, comprising a homogeneous, intimate mixture of from 50% to 90% of a styrene-acrylonitrile resinous copolymer, and correspondingly from 50% to 10% of an elastomeric portion, the said percentages of resin and elastomer being based on the total weight of the said mixed resin and elastomeric portion, the said resin having a styrene content of from 50% to 90%, and the said elastomeric portion being composed in turn of from 85% to 35% of butadiene-acrylonitrile copolymer rubber and correspondingly from 15% to 65% of a saturated rubbery copolymer of a lower alkyl acrylate with a copolymerizable monoethylenically unsaturated monomer selected from the group consisting of acrylonitrile, 3-chloropropyl acrylate and 2-chloroethyl vinyl ether, the said percentages of butadiene-acrylonitrile rubber and acrylate copolymer rubber being based on the total weight of the two said rubbers, the said butadiene-acrylonitrile rubber containing from 18% to 48% of acrylonitrile, and the said acrylate copolymer rubber containing from 4% to 20% of said copolymerizable monoethylenically unsaturated monomer.

2. The vulcanized composition of claim 1.

3. A hard, tough, thermoplastic composition characterized by exceptional resistance to weathering comprising a homogeneous, intimate mixture of from 60% to 80% of styrene-acrylonitrile resinous copolymer and correspondingly from 40% to 20% of an elastomeric portion, the said percentages of resin and elastomeric portion being based on the total weight of the said mixed resin and elastomeric portion, the said resin containing from 50% to 90% of combined styrene, and the said elastomeric portion being composed in turn of from 85% to 35% of butadiene-acrylonitrile copolymer rubber and from 15% to 65% of a saturated rubber which is a copolymer of a lower alkyl acrylate with a copolymerizable monoethylenically unsaturated monomer selected from the group consisting of acrylonitrile, 3-chloropropyl acrylate and 2-chloroethyl vinyl ether, the said percentages of butadiene-acrylonitrile rubber and saturated acrylate rubber being based on the total weight of the two said rubbers, the said butadiene-acrylonitrile copolymer rubber containing from 18% to 48% of acrylonitrile, and the said saturated acrylate rubber containing from 4% to 20% of the said copolymerizable monoethylenically unsaturated monomer.

4. A hard, tough, thermoplastic composition characterized by exceptional resistance to weathering comprising a homogeneous, intimate mixture of from 60% to 80% of a styrene-acrylonitrile resinous copolymer and correspondingly from 40% to 20% of an elastomeric portion, the said percentages of resin and elastomeric portion being based on the total weight of the said mixed resin and elastomeric portion, the said resin having a styrene content of from 70% to 80%, and the said elastomeric portion being composed in turn of from 70% to 50% of butadiene-acrylonitrile copolymer rubber and correspondingly from 30% to 50% of a saturated rubber which is a copolymer of a lower alkyl acrylate with a copolymerizable monoethylenically unsaturated monomer selected from the group consisting of acrylonitrile, 3-chloropropyl acrylate and 2-chloroethyl vinyl ether, the said percentages of butadiene-acrylonitrile rubber and saturated acrylate rubber being based on the total weight of the two said rubbers, the said butadiene-acrylonitrile copolymer rubber containing from 18% to 48% of acrylonitrile, and the said saturated acrylate copolymer rubber containing from 4% to 20% of the said copolymerizable monoethylenically unsaturated monomer.

5. A composition as in claim 4 in which the lower alkyl acrylate is ethyl acrylate.

6. A composition as in claim 4 in which the lower alkyl acrylate is N-butyl acrylate.

7. A composition as in claim 5 in which the copolymerizable monoethylenically unsaturated monomer is 2-chloroethylvinyl ether.

8. A composition as in claim 6 in which the copolymerizable monoethylenically unsaturated monomer is acrylonitrile.

9. A composition as in claim 7 in which the butadiene-acrylonitrile rubber has a tight gel content within the range of from 50% to 80% the said tight gel being that portion of the said rubber which is insoluble in toluene and which is incapable of conversion into a soluble gel by mastication.

10. A composition as in claim 8 in which the butadiene-acrylonitrile rubber has a tight gel content within the range of from 50% to 80% the said tight gel being that portion of the said rubber which is insoluble in toluene and which is incapable of conversion into a soluble gel by mastication.

11. A hard, tough, thermoplastic composition characterized by exceptional resistance to weathering comprising a homogeneous, intimate mixture of 70% of styrene-acrylonitrile resinous copolymer containing from 50% to 90% of combined styrene and 30% of an elastomeric portion made up in turn of ⅔ of butadiene-acrylonitrile copolymer rubber containing from 18% to 48% of combined acrylonitrile and ⅓ of a saturated rubber which is a copolymer of ethyl acrylate with from 4% to 20% of a copolymerizable monoethylenically unsaturated monomer selected from the group consisting of acrylonitrile, 3-chloropropyl acrylate and 2-chloroethyl vinyl ether.

12. A composition as in claim 11 in which the copolymerizable monoethylenically unsaturated monomer is 2-chloroethyl vinyl ether.

13. A hard, tough, thermoplastic composition characterized by exceptional resistance to weathering comprising a homogeneous, intimate mixture of 70% of styrene-acrylonitrile resinous copolymer containing from 50% to 90% styrene, and 30% of an elastomeric portion made up in turn of ⅔ butadiene-acrylonitrile copolymer rubber containing from 18% to 48% of acrylonitrile, and ⅓ of a saturated rubber which is a copolymer of N-butyl acrylate with from 4% to 20% of a copolymerizable monoethylenically unsaturated monomer selected from the group consisting of acrylonitrile, 3-chloropropyl acrylate and 2-chloroethyl vinyl ether.

14. A composition as in claim 13 in which the copolymerizable monoethylenically unsaturated monomer is acrylonitrile.

References Cited in the file of this patent

UNITED STATES PATENTS

| Number | Name | Date |
|---|---|---|
| 2,256,618 | Kistler et al. | Sept. 23, 1941 |
| 2,439,202 | Daly | Apr. 6, 1948 |
| 2,550,139 | Daly | Apr. 24, 1951 |

OTHER REFERENCES

Mast et al. article in India Rubber World, June 1947, pages 355–360.